United States Patent [19]

Sumser

[11] Patent Number: 4,719,758
[45] Date of Patent: Jan. 19, 1988

[54] DEVICE FOR CHANGING THE DIRECTION OF AN AIRFLOW ENTERING THROUGH THE INTAKE OF A COMPRESSOR OF AN EXHAUST GAS TURBO-CHARGER

[75] Inventor: Siegfried Sumser, Stuttgart, Fed. Rep. of Germany

[73] Assignee: Daimler-Benz Aktiengesellschaft, Fed. Rep. of Germany

[21] Appl. No.: 897,630

[22] Filed: Aug. 18, 1986

[30] Foreign Application Priority Data

Aug. 16, 1985 [DE] Fed. Rep. of Germany ....... 3529281

[51] Int. Cl.⁴ .............................................. F02B 37/12
[52] U.S. Cl. ...................................... 60/611; 415/159
[58] Field of Search .......................... 60/600, 601, 611; 123/564; 415/148, 155, 157, 158, 159, 167

[56] References Cited

U.S. PATENT DOCUMENTS 2,336,010  12/1943  Gregory et al. ..................... 415/159

FOREIGN PATENT DOCUMENTS 1291943  4/1969  Fed. Rep. of Germany .
1526455  2/1970  Fed. Rep. of Germany ........ 60/611
2350091  4/1975  Fed. Rep. of Germany ........ 60/611
62928    4/1982  Japan ..................................... 60/611
167824  10/1983  Japan ..................................... 60/611
87231    5/1984  Japan ..................................... 60/611

Primary Examiner—Michael Koczo
Attorney, Agent, or Firm—Barnes & Thornburg

[57] ABSTRACT

The invention concerns a device for changing the flow direction of an airflow entering the suction-side opening of a compressor of an exhaust gas turbo-charger of an internal combustion engine. The airflow is deflected into the rotational direction of the compressor impeller by means of a guide device located in the induction duct upstream of the inlet opening. In order to achieve required flow through a mechanically simply producible guide device, a bypass duct which has an annular space branches off from the induction duct upstream of the compressor to the guide device. The annular space surrounds the induction duct in the region of the suction-side opening of the compressor. Nozzle-shaped openings are provided in a common partition between the annular space and the induction duct and a shut-off valve is located in the induction duct between these openings and the point where the bypass duct branches off.

7 Claims, 2 Drawing Figures

DEVICE FOR CHANGING THE DIRECTION OF AN AIRFLOW ENTERING THROUGH THE INTAKE OF A COMPRESSOR OF AN EXHAUST GAS TURBO-CHARGER

BACKGROUND AND SUMMARY OF THE INVENTION

The invention concerns a device for changing the direction of an airflow entering through the intake of a compressor of an exhaust gas turbo-charger of an internal combustion engine.

A device for changing the direction of an airflow entering through the intake of a compressor of an exhaust gas turbo-charger is known from German Offenlegunsschrift (Published Unexamined Patent Application) No. 1,526,455. This device comprises a bypass duct which is assigned to the induction duct and leads to a guide device with an annular space which surrounds the induction duct in the region of the suction-side opening of the compressor. Nozzle-shaped outlet openings are provided in the common partition between the annular space and the induction duct. However, this arrangement involves the disadvantage that to increase the speed of the exhaust gas turbo-charger, it has to be supplied with compressed air via the bypass duct from a pressure source, such as for example an air brake cylinder or compressor. The compression causes the air supplied to the compressor to be heated, impairing the efficiency of the compressor.

Also known from German Offenlegungsschrift No. 2,350,091 is a supercharged internal combustion engine with two throttleable induction ducts leading to the compressor, one of which ducts opens out, at an angle, in other words changing the direction of inflow, in the other induction duct. However, this involves the disadvantage that the compressor impeller is only partially subjected to tangential flow. The resultant increased ventilation causes the efficiency of the compressor to be reduced.

An exhaust gas turbo-charger on an internal combustion engine with an annular-shaped duct with variable guide vanes located in the region of the suction-side opening of the compressor is known from German Patent No. 1,291,943. A disadvantage of this arrangement, however, is that the extra ducting of the combustion air increases the flow resistance due to the duct and the guide vanes located within it, particularly in the full load range of the internal combustion engine and that, in consequence, the efficiency of the exhaust gas turbo-charger is reduced. In addition, the construction and control of the adjustable guide vanes is found to be complicated and expensive.

An object of the invention is to promote the revving of the compressor in the induction phase of a supercharged internal combustion engine by means of an airflow supplied to the compressor impeller dependent on engine load.

The invention achieves this object by providing a rotatable sleeve with nozzle shaped openings which can effectively adjust the effective flow cross-sectional area of outlet openings in the annular space which supply air to the compressor.

In especially preferred embodiments of the invention a shut-off valve is located in the induction duct upstream of the compressor intake and downstream of the bypass duct connection. Embodiments are also contemplated with automatic adjusting means for adjusting the sleeve for increasing the air outlet opening cross-sectional area with increasing engine load. In especially preferred embodiments the engine load condition is determined by means of the engine rotational speed and the accelerator position.

The guide device in accordance with the invention has the advantage that the guide device changing the flow direction has air flowing through it only in the idling and lower part load operation of the internal combustion engine and therefore does not influence the system by increasing the flow resistance and disadvantageously changing the efficiency of the exhaust gas turbo-charger in upper part load and full load operation. The simple maintenance-free guide device with few moving components does not require any expensive control—it being only necessary to close the induction air duct by means of the shut-off valve. Because of the mechanically simple and spatially compact design, the guide device can also be retrofitted in the induction duct of the internal combustion engine.

Further objects, features, and advantages of the present invention will become more apparent from the following description when taken with the accompanying drawings(s) which show, for purposes of illustration only, an embodiment/several embodiments in accordance with the present invention.

DETAILED DESCRIPTION OF THE DRAWINGS

Figure 1:
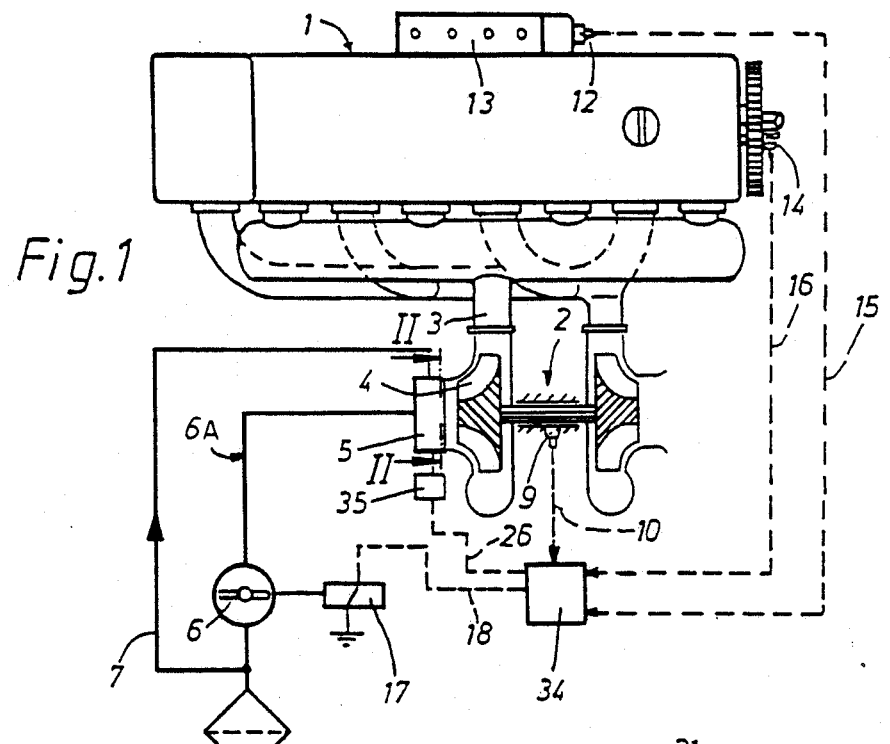
FIG. 1 diagrammatically depicts an arrangement of a guide device for changing the flow direction of an airflow supplied to the compressor impeller of an exhaust gas turbo-charger on an internal combusion engine, constructed in accordance with a preferred embodiment of the invention.

In FIG. 1, an air-compressing internal combustion engine with an exhaust gas turbo-charger 2 is indicated by 1. Upstream of the compressor 4, located in the induction duct 3 of the internal combustion engine 1, there is a guide device 5 for changing the flow direction of the airflow supplied to the compressor 4. The flow cross-sectional area of the induction duct 3 can be selectively closed by means of a shut-off valve 6 located in the induction duct 3 upstream of the guide device 5. A bypass 7 branches off from the induction duct 3 upstream of the shut-off valve 6 and enters an annular space 8 of the guide device 5, which annular space surrounds the induction duct 3 in the region of the intake of the compressor 4. Sensors 9, 12, 14 record the rotational speed of the exhaust gas turbo-charger, the rotational speed of the internal combustion engine and the position of the accelerator pedal and/or the control rod displacement of the fuel injection pump 13 of the internal combustion engine 1.

Figure 2:
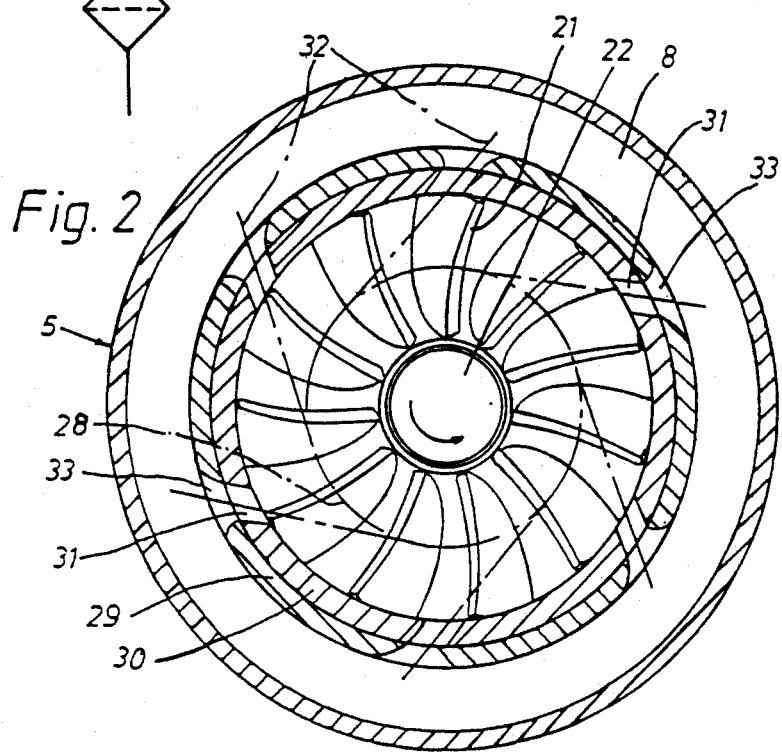
FIG. 2 is a vertical sectional view through the guide device along the Line II—II in FIG. 1.

The effective connection between the sensors 12, 14 and the control unit 34 is provided by signal transmitting conductors 15, 16. A setting drive 35 actuated by auxiliary force, which is connected with the control unit 34 by means of a conductor 26, is controlled by the control unit 34. The setting drive 34 is associated with a pivotable sleeve 29, surrounding the induction duct 3 in the annular space 8, as shown in FIG. 2. The common partition 30 between the induction duct 3 and the annular space 8 has cylindrical outlet openings 31 evenly distributed around the periphery. The centre lines 32 of the outlet openings 31 point in the direction of the rotating vanes 26 and are tangential, on the suction side of the rotating vanes 21, to the virtual central circle 28 described by the meridianal centre lines. The common partition 30 is surrounded on the annular space side by a rotatably located sleeve 29. The sleeve 29 has nozzle-shaped penetrations or openings 33 widening towards the annular space 8 and evenly distributed around the periphery. The centre lines of the openings 33 are congruent with the respective centre lines 32 when openings 33 and 31 are aligned. Using a setting drive, shown schematically at 35, the sleeve 29 can be rotated in such a way that the flow cross-sectional areas of the openings 31 can be changed as a function of the engine load so that the flow cross-sectional areas are increased with increasing load. The load condition of the internal combustion engine is determined in the control unit 34 by means of the internal combustion engine rotational speed and the displacement of the control rod. The engine speed and accelerator pedal position is used to determine the load condition in certain other embodiments.

If, when the internal combustion engine 1 is idling, the rotational speed of the exhaust gas super-charger 2 falls below a specified value, the contol unit 34 activates the electromagnetic setting drive 17, which deflects the shut-off valve 6 into a position closing a flow cross-sectional area of the induction duct 3 by closing line 6A. The airflow to be supplied to the internal combustion engine 1 is then supplied via the bypass duct 7 to the annular space 8. The air sucked in by the internal combustion engine flows from the annular space 8 through the outlet openings 31 and openings 33 directed in the rotational direction of the compressor impeller 22. The instantaneous load condition of the internal combustion engine 1 is determined in the control unit 34 by means of the internal combustion engine rotational speed and the control rod displacement of the fuel injection pump and/or accelerator pedal position. The load-dependent flow cross-sectional area of the outlet openings 31 can be adjusted by means of the sleeve which is rotated by the setting drive 35. By this means, the flow cross-sectional area is increased with increasing load until it is completely open in the lower part-load operation of the internal combustion engine. When a previously specified load range is exceeded, the setting drive 17 is activated by the control unit 34. The shut-off valve 6 is then pivoted into its basic open position. Air is then supplied to the compressor impeller 22 through the inlet line 6A only, the sleeve 29 being moved to a position closing openings 31,33.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. An exhaust gas turbo-charger arrangement comprising:

compressor intake means for guiding air to an exhaust gas driven compressor, induction duct means opening to the compressor intake means, bypass duct means bypassing the induction duct means and opening to an annular space disposed upstream of the compressor intake means in surrounding relationship to the induction duct means, outlet openings leading from the annular space to the compressor intake means, sleeve means for changing the flow cross-sectional area of the outlet openings to the compressor intake means, said sleeve means having nozzle-shaped openings and being arranged to be rotatable in the annular space, a shut-off valve located in the induction duct means upstream of the compressor intake means and downstream of the connection of the bypass duct means, and shut-off valve control means for controlling the opening of the shut-off valve as a function of engine load conditions.

2. An arrangement according to claim 1, wherein outlet opening control means are provided for automatically increasing the flow cross-sectional areas of the outlet openings with increasing load on an internal combustion engine which supplies exhaust gases to drive the compressor for compressing air supplied via the compressor intake means.

3. An arrangement according to claim 2, wherein the instantaneous load condition of the internal combustion engine is determined by means of the internal combustion engine rotational speed and the position of the accelerator pedal.

4. An arrangement according to claim 1, wherein said shut-off valve control means includes means for closing the shut-off valve when a vehicle engine using the turbo-charger arrangement is idling and the rotational speed of the exhaust gas-driven compressor falls below a predetermined low value, whereby air flow is then supplied via the by-pass duct means.

5. An arrangement according to claim 4, wherein outlet opening control means are provided for automatically increasing the flow cross-sectional areas of the outlet openings with increasing load on an internal combustion engine which supplies exhaust gases to drive the compressor for compressing air supplied via the compressor intake means.

6. An arrangement according to claim 5, wherein the instantaneous load condition of the internal combustion engine is determined by means of the internal combustion engine rotational speed and the position of the accelerator pedal.

7. An arrangement according to claim 5, wherein said shut-off valve control means includes means for opening the shut-off valve when the vehicle engine is operating above a predetermined engine load, and wherein said outlet opening control means include means for closing the flow cross-sectional area of the outlet openings when the vehicle engine is operating above the predetermined engine load, whereby air flow is then supplied via the induction duct means.

* * * * *